(12) United States Patent
Johnson et al.

(10) Patent No.: US 11,150,393 B2
(45) Date of Patent: Oct. 19, 2021

(54) MULTILAYER OPTICAL FILM

(71) Applicant: 3M INNOVATIVE PROPERTIES COMPANY, St. Paul, MN (US)

(72) Inventors: Matthew B. Johnson, Woodbury, MN (US); Adam D. Haag, Woodbury, MN (US); Martin E. Denker, Vadnais Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 56 days.

(21) Appl. No.: 16/815,407

(22) Filed: Mar. 11, 2020

(65) Prior Publication Data

US 2020/0209454 A1 Jul. 2, 2020

Related U.S. Application Data

(63) Continuation of application No. 16/393,495, filed on Apr. 24, 2019, now Pat. No. 10,627,557, which is a continuation of application No. 14/916,775, filed as application No. PCT/US2014/053865 on Sep. 3, 2014, now Pat. No. 10,288,789.

(Continued)

(51) Int. Cl.
| | | |
|---|---|---|
| *G02B 5/30* | (2006.01) | |
| *B32B 7/02* | (2019.01) | |
| *B32B 27/08* | (2006.01) | |
| *B32B 27/36* | (2006.01) | |
| *G02B 5/08* | (2006.01) | |

(52) U.S. Cl.
CPC .............. *G02B 5/3083* (2013.01); *B32B 7/02* (2013.01); *B32B 27/08* (2013.01); *B32B 27/36* (2013.01); *B32B 27/365* (2013.01); *G02B 5/0841* (2013.01); *G02B 5/305* (2013.01); *B32B 2307/42* (2013.01)

(58) Field of Classification Search
CPC .... G02B 5/0841; G02B 5/305; G02B 5/3083; B32B 7/02
USPC .............. 359/485.03, 489.11, 489.13, 489.16
See application file for complete search history.

(56) References Cited

U.S. PATENT DOCUMENTS

| | | |
|---|---|---|
| 3,610,729 A | 10/1971 | Rogers |
| 4,446,305 A | 5/1984 | Rogers |

(Continued)

FOREIGN PATENT DOCUMENTS

| | | |
|---|---|---|
| CN | 102089685 A | 6/2011 |
| JP | 2002-160339 A | 6/2002 |

(Continued)

OTHER PUBLICATIONS

International Search Report for PCT International Application No. PCT/US2014/053865, dated Oct. 28, 2014, 4 pages.

(Continued)

*Primary Examiner* — Ricky D Shafer

(74) *Attorney, Agent, or Firm* — Robert S. Moshrefzadeh

(57) ABSTRACT

Thermoplastic birefringent multilayer optical films are described. More particularly, thermoplastic multilayer films having alternating first and second layers having a linear layer profile where both outer layers are thinner than 350 nm but thicker than 150 nm are described. Thermoplastic birefringent multilayer optical films with thinner outer protective boundary layers are described.

9 Claims, 1 Drawing Sheet

Related U.S. Application Data

(60) Provisional application No. 61/874,658, filed on Sep. 6, 2013.

(56) References Cited

U.S. PATENT DOCUMENTS

| | | | |
|---|---|---|---|
| 4,540,623 | A | 9/1985 | Im |
| 4,937,134 | A | 6/1990 | Schrenk |
| 5,126,880 | A | 6/1992 | Wheatley et al. |
| 5,278,694 | A | 1/1994 | Wheatley et al. |
| 5,448,404 | A | 9/1995 | Schrenk |
| 5,540,978 | A | 7/1996 | Schrenk |
| 5,872,653 | A | 2/1999 | Schrenk |
| 5,882,774 | A | 3/1999 | Jonza |
| 6,352,761 | B1 | 3/2002 | Hebrink |
| 7,104,776 | B2 | 9/2006 | Merrill |
| 8,067,094 | B2 * | 11/2011 | Benson ............... B32B 27/283 428/447 |
| 8,524,370 | B2 | 9/2013 | Benson et al. |
| 8,932,701 | B2 * | 1/2015 | Kranz ............... B32B 17/1099 428/192 |
| 9,046,656 | B2 | 6/2015 | Liu et al. |
| 9,919,339 | B2 * | 3/2018 | Johnson ............... B05D 1/30 |
| 10,288,789 | B2 | 5/2019 | Johnson et al. |
| 10,627,557 | B2 * | 4/2020 | Johnson ............ G02B 5/3083 |
| 2001/0021445 | A1 | 9/2001 | Weber |
| 2002/0017736 | A1 | 2/2002 | Kausch |
| 2004/0069977 | A1 | 4/2004 | Oya |
| 2007/0047080 | A1 | 3/2007 | Stover |
| 2007/0177272 | A1 | 8/2007 | Benson et al. |
| 2007/0254107 | A1 | 11/2007 | Rao et al. |
| 2008/0002256 | A1 | 1/2008 | Sasagawa |
| 2010/0124667 | A1 | 5/2010 | Liu et al. |
| 2011/0102891 | A1 | 5/2011 | Derks |
| 2011/0272849 | A1 | 11/2011 | Neavin |
| 2014/0307205 | A1 | 10/2014 | Banerjee et al. |

FOREIGN PATENT DOCUMENTS

| | | |
|---|---|---|
| JP | 2002-162518 A | 6/2002 |
| WO | WO 1999-36256 | 7/1999 |
| WO | WO 02/095456 | 11/2002 |
| WO | WO 2006/044075 A1 | 4/2006 |
| WO | WO 2010/059416 A1 | 5/2010 |
| WO | WO 2012/003123 A1 | 1/2012 |

OTHER PUBLICATIONS

H. A. Macleod, Thin-Film Optical Filters, 2nd Ed., Macmillan Publishing Co. (1986).

A. Thelan, Design of Optical Interference Filters, McGraw-Hill, Inc. (1989).

* cited by examiner

MULTILAYER OPTICAL FILM

BACKGROUND

Thermoplastic birefringent multilayer optical films are generally formed by layering extruded polymers in feedblocks. In some manufacturing processes, depending on the size of the feedblock, processing conditions, and thickness of the extrudate, shear forces on the outer layers passing through the feedblock may be significant. This can cause layer breakup in the outer layers, often making the ultimate films unusable for their desired purpose. To protect the film throughout manufacturing, thick protective boundary layers or thick skin layers are provided.

SUMMARY

In one aspect, the present description relates to a multilayer film. More particularly, the present description relates to a thermoplastic birefringent multilayer film including alternating first and second layers having a substantially linear layer profile. Both outer layers o the thermoplastic birefringent multilayer optical film are thinner than 350 nm but thicker than 150 nm. No intermediate layer is thicker than 350 nm. Both outer layers of the thermoplastic birefringent multilayer optical film include the same material as either the first or second layer. A minimum average delamination of the thermoplastic birefringent multilayer optical film is greater than 100 g/in. In some embodiments, no intermediate layer is thicker than 150 nm. In some embodiments, at least one of the alternating first and second layers are oriented birefringent polymer layers.

In some embodiments, the thermoplastic birefringent multilayer optical film is thinner than 50 microns; in other embodiments the thermoplastic birefringent multilayer optical film is thinner than 20 microns. In some cases, the thermoplastic birefringent multilayer optical film has fewer than 200 layers. In some embodiments, the thermoplastic birefringent multilayer optical film is a reflective polarizer. The thermoplastic birefringent multilayer optical film may also be a mirror. The thermoplastic birefringent multilayer optical film may be provided in roll form or integrated into a backlight.

DETAILED DESCRIPTION

Figure 1:
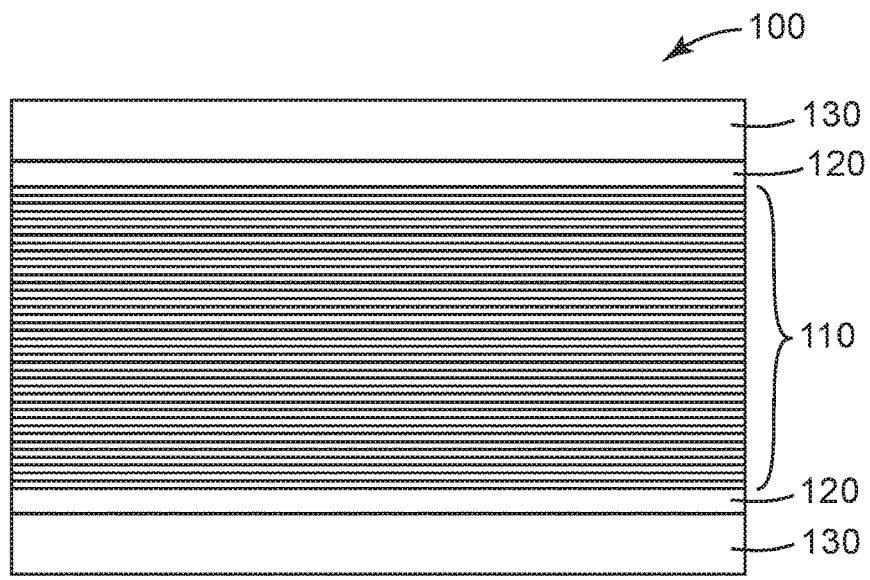
FIG. 1 is a schematic cross-sectional representation of the construction of Comparative Example C1.

Multilayer optical films, i.e., films that provide desirable transmission and/or reflection properties at least partially by an arrangement of microlayers of differing refractive index, are known. It has been known to make such multilayer optical films by depositing a sequence of inorganic materials in optically thin layers ("microlayers") on a substrate in a vacuum chamber. Inorganic multilayer optical films are described, for example, in textbooks by H. A. Macleod, *Thin-Film Optical Filters*, 2nd Ed., Macmillan Publishing Co. (1986) and by A. Thelan, *Design of Optical Interference Filters*, McGraw-Hill, Inc. (1989).

Multilayer optical films have also been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. These may be referred to as thermoplastic multilayer optical films. Such films are compatible with high volume manufacturing processes and can be made in large sheets and roll goods. The description and examples below relate to thermoplastic multilayer optical films.

A multilayer optical film includes individual microlayers having different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 µm. Layers may be arranged generally as thinnest to thickest. In some embodiments, the arrangement of the alternating optical layers may vary substantially linearly as a function of layer count. These layer profiles may be referred to as linear layer profiles. Thicker layers may be included, such as skin layers at the outer surfaces of the multilayer optical film, or protective boundary layers (PBLs) disposed within the multilayer optical films, that separate coherent groupings (referred to herein as "packets") of microlayers. In some cases, the protective boundary layer may be the same material as at least one of the alternating layers of the multilayer optical film. In other cases, the protective boundary layer may be a different material, selected for its physical or rheological properties. The protective boundary layers may be on one side or one both sides of an optical packet. In the case of a single-packet multilayer optical film, the protective boundary layer may be on one or both external surfaces of the multilayer optical film.

Skin layers are sometimes added which occurs after the feedblock but before the melt exits the film die. The multilayer melt is then cast through a film die onto a chill roll in the conventional manner for polyester films, upon which it is quenched. The cast web is then stretched in different ways to achieve birefringence in at least one of the optical layers, producing in many cases either a reflective polarizer or mirror film, as has been described in, for example, U.S. Patent Publication No. 2007/047080 A1, U.S. Patent Publication No. 2011/0102891 A1, and U.S. Pat. No. 7,104,776 (Merrill et al.). The films, having birefringence, may be referred to as thermoplastic birefringent multilayer optical films.

These films have a variety of uses where the films are laminated to other film constructions (e.g. absorbing polarizers, polycarbonate or polyester sheets) and/or articles (e.g. LCD displays). At a point in each manufacturing process, there is typically a converting step where the MOF or laminated MOF is cut by any variety of processes, e.g. shear, rotary die, die press, laser, etc. One particular failure mode during these converting and subsequent handling steps (e.g. packaging, premask removal, display assembly, etc.) is the potential delamination of the multilayer construction. Delamination typically occurs in multilayer optical films between the outermost layer, which in some embodiments is a skin or PBL, and optical layers. Delamination can then propagate into the multilayer leaving a visible defect, which is undesirable.

In some applications, it is desirable to create a thinner multilayer optical film. In some embodiments, it may also be desirable to maintain optical performance such as gain and mechanical properties such as delamination resistance in these thinner films. Note that "thinner" as used here may also refer to the ability to add additional optically active (e.g., to improve optical performance) or inactive layers (e.g., to improve physical characteristics) yet preserve the same or similar thickness. Because the optical function of the microlayers in the reflective polarizer is linked to the specific optical thickness of each microlayer, it is often not possible to achieve the same optical properties simply by making each microlayer thinner Also, reducing the number of microlayers can achieve a thinner film but the optical performance, for example, gain, will be reduced. Process changes may be made to increase optical performance but the delamination resistance is typically reduced by these process changes. Previously, it has been difficult to achieve a thinner multilayer optical film while maintaining both optical performance and delamination resistance. Further, it was thought that reducing the thickness of PBLs, while reducing overall thickness, would result in a film that would either fail in manufacture or have significant defects due to feedblock shear. Surprisingly, not only did thinner PBLs enable thinner overall multilayer optical films, but it also provided improved delamination resistance for the overall film while not having significant defects due to feedblock shear. The protective boundary layers may in some cases be thinner than 350 nm, in some cases be thinner than 300 nm, in some cases be thinner than 200 nm, and in some cases even be as thin as 150 nm, about the thickness of the thickest optical layer. In some embodiments, the multilayer films may have no intermediate layers thicker than 350 nm or even no layers thicker than 150. Multilayer optical films described herein may be, overall, thinner than 50 µm, thinner than 30 µm, thinner than 20 µm, or thinner than 17 µm.

One measure of performance of a multilayer optical film in the context of a display system is referred to as "gain". The gain of an optical film is a measure of how much brighter the display appears to the viewer with the optical film compared to the display without the optical film. More specifically, the gain of an optical film is the ratio of the luminance of the display system (or of a portion thereof, such as the backlight) with the optical film to the luminance of the display system without the optical film. Since luminance is in general a function of viewing orientation, gain is also a function of viewing orientation. If gain is referred to without any indication of orientation, on-axis performance is ordinarily presumed. For reflective polarizers, gains are normally associated with very high reflectivity for the block axis and very high transmissivity (very low reflectivity) for the pass axis, for both normally and obliquely incident light. This is because a very high block axis reflectivity maximizes the chance that a light ray of the non-useable polarization will be reflected back into the backlight so that it can be converted to the useable polarization; and a very low pass axis reflectivity maximizes the chance that a light ray of the useable polarization will pass out of the backlight towards the LC panel, with minimal loss.

EXAMPLES

Delamination Test Method

Film samples were prepared and cut into 1 inch (2.54 cm) wide by 12 inch (30 cm) strips. Double sided tape (3M 665 Double Sided Tape available from 3M Company, St. Paul, Minn.) was attached to a metal plate and a sample strip was attached to the double sided tape. The excess film was cut from one end of the plate so that the film was flush with that edge of the plate while the other edge was scored by cutting at a sharp angle with a razor blade. One end of an approximately 1.5 in (4 cm) strip of tape (3M 396 tape available from 3M Company, St. Paul, Minn.) was folded onto itself to form a ½ inch (1.3 cm) non-sticky tab. The other end of the tape was applied to the scored edge of the film sample. A 90 degree peel test was then performed using an IMASS SP-2000 peel tester (IMASS Inc., Accord, Mass.) with a peel speed of 60 in/min (1.5 m/min) using a 5 second averaging time. Five strips were tested for each film sample. For the results given in the Examples, the minimum value is reported for sake of comparing weakest or lowest force required to delaminate layers from each other. In cases where no value was able to be measured due to the high peel force required, the value is reported as 10,000+ g/in. All Comparative Examples and Examples (except for Comparative Example C1) had a substantially linear layer profile within the alternating layer optical packet.

Comparative Example C1

A birefringent reflective polarizer was prepared as follows. A single multilayer optical packet was co-extruded as described in US Patent Application Publication No. 2011/0102891, entitled "Low Layer Count Reflective Polarizer with Optimized Gain". Polymers generally described in U.S. Pat. No. 6,352,761 (Hebrink et al.) were used for the optical layers. The co-extruded optical packet contained 275 alternating layers of 90/10 coPEN, a polymer composed of 90% polyethylene naphthalate (PEN) and 10% polyethylene terephthalate (PET), and a low index isotropic layer. The low index isotropic layer was made with a blend of polycarbonate and copolyesters (PC:coPET) with the PC:coPET molar ratio of approximately 42.5 mol % polycarbonate and 57.5 mol % coPET. The low index layer had a refractive index of about 1.57 and remained substantially isotropic upon uniaxial orientation. The Tg of the PC:coPET was 105° C.

The reflective polarizer was manufactured using the feedblock method described in U.S. Patant Application Publication No. 2011/0272849 entitled "Feedblock for Manufacturing Multilayer Polymeric Films". The 90/10 PEN and PC:coPET polymers were fed from separate extruders to a multilayer coextrusion feedblock, in which they were assembled into a packet of 275 alternating optical layers, plus thicker protective boundary layers of the PC:coPET on each side, for a total of 277 layers. After the feedblock, skin layers were added where the polymer used for the skin layers was a second PC:coPET having ratio of 50 mol % PC and 50 mol % coPET and having a Tg of 110° C. The multilayer melt was then cast through a film die onto a chill roll, in the conventional manner for polyester films, upon which it was quenched. The cast web was then stretched in a parabolic tenter as described in U.S. Pat. No. 7,104,776 (Merrill et al.) at temperature and draw ratio given in Table 1. The film had a resulting thickness as measured by a capacitance gauge of approximately 26.5 µm. The corresponding PBL plus skin thickness was approximately 6 µm (3 µm/side) as measured by optical microscopy and atomic force microscopy. A schematic of Comparative Example C1 is displayed in FIG.

1. FIG. 1 shows optical film 100, including alternating optical packet 110, protective boundary layers 120, and skin layers 130.

The minimum delamination peel force measured for Comparative Example C1 was approximately 80 g/in (0.785 N/25.4mm). The gain was measured using a SpectraScan™ PR-650 SpectraColorimeter with an MS-75 lens, available from Photo Research, Inc (Chatsworth, Calif.) as described in US Pat. App. Pub. No. US 2008/0002256 (Sasagawa et al.).

Comparative Example C2

Figure 2:
FIG. 2 is a schematic cross-sectional representation of the construction of Comparative Example C2, Comparative Examples C3a-C3c, Examples 1a-1f, and Examples 2a-2d.

A birefringent reflective polarizer was prepared in a manner similar to Comparative Example C1 as follows. A single multilayer optical packet was co-extruded containing of 275 alternating layers of 90/10 coPEN and PC:coPET. The 90/10 PEN and PC:coPET polymers were fed from separate extruders to a multilayer coextrusion feedblock, in which they were assembled into a packet of 275 alternating optical layers, plus thicker protective boundary layers of the PC:coPET on each side, for a total of 277 layers. The multilayer melt was then processed in a similar manner to Comparative Example C1 with differences listed in Table 1. The corresponding PBL thickness (where no skins were co-extruded) was approximately 2 µm (1 µm/side) as measured by optical microscopy and atomic force microscopy. A schematic of Comparative Example C2 is displayed in FIG. 2. FIG. 2 shows optical film 200, including alternating optical packet 210 and protective boundary layers 220. The minimum delamination value measured for Comparative Example C2 was approximately 120 g/in (1.18 N/25.4 mm). By removing the skin layer, the delamination strength was improved versus Comparative Example C1 for similar process conditions and finished film thickness.

Comparative Example C3a-C3c

A birefringent reflective polarizer was prepared in a similar manner to Comparative Example C2 except that the first and second optical layers were assembled into a packet of 220 alternating optical layers, plus protective boundary layers of the PC:coPET on each side, for a total of 222 layers. The multilayer melt was then processed in a similar manner to Comparative Example C2 with exception of certain parameters, listed in Table 1. No skin layers were applied. The resulting total thickness was 20 µm and the outer layer PBL thickness was approximately 2 µm (1 µm/side) as measured by optical microscopy and atomic force microscopy. Comparative Examples C3a-C3c had a similar cross-section to that of Comparative Example C2, with the exception of lower layer count. The minimum delamination measured for Comparative Example C3a was approximately 88 g/in (0.86 N/25.4mm) for stretch ratio, PBL thickness and processing conditions similar to Comparative Example C2. The delamination level for Comparative Example C3a was reduced by approximately 27% from Comparative Example C2. Further increasing draw ratio from 6x (Comparative Example C3a) to 6.3x (Comparative Example C3b) and then to 6.7x (Comparative Example C3c) reduced delamination strength by 52%. The result indicated that reducing the total thickness alone relative to Comparative Example C2 was not sufficient to achieve improved delamination performance.

Example 1a-1f

A birefringent reflective polarizer was prepared in a similar manner to Comparative Example C2 with the exception that the first and second optical layers were assembled into a packet of 183 alternating optical layers, plus protective boundary layers of the PC:coPET on each side, for a total of 185 layers. The multilayer melt was then processed in a similar manner to Comparative Example C2 with exceptions listed in Table 1. The resulting total thickness was approximately 16.5 µm. The corresponding PBL thickness (no skins were co-extruded) was approximately 0.7 µm (0.35 µm/side) as measured by optical microscopy and atomic force microscopy. Examples 1a-1f had similar cross-sections to that of Comparative Example C2, with the exception of lower layer count and PBL thickness. Examples 1a-1f showed improved delamination performance.

Example 2a-2d

A birefringent reflective polarizer was prepared in a similar manner to Comparative Example C2 with the exception that the first and second optical layers were assembled into a packet of 173 alternating optical layers, plus protective boundary layers of the PC:coPET, on each side, for a total of 175 layers. The multilayer melt was then processed in a similar manner to Comparative Example C2 with exceptions listed in Table 1, resulting in a film with a total thickness of approximately 15.5 µm. The corresponding PBL thickness (no skins were co-extruded) was approximately 0.5 µm (0.25 µm/side) as measured by optical microscopy and atomic force microscopy. Examples 2a-2d had a similar cross-section to that of Comparative Example C2, with exception of lower layer count and smaller PBL thickness. Examples 2a-2d also showed improved delamination performance.

Example 3

Figure 3:
FIG. 3 is a schematic cross-sectional representation of the construction of Example 3.

A birefringent reflective polarizer was prepared in a similar manner to Comparative Example C2 with the exception that the first and second optical layers were assembled into a packet of 186 alternating optical layers, plus a protective boundary layer of the PC:coPET on only the cast wheel side, for a total of 187 layers. The outer optical layer on the cast wheel side was formed from the PC:coPET blend that was used to form the thicker PBL layer on the opposite side. The multilayer melt was then processed in a similar manner to Example 1e, resulting in a total thickness of approximately 16.3 µm. The corresponding single PBL thickness (no skins were co-extruded) was approximately 0.25 µm. A schematic cross-section for Example 3 is depicted in FIG. 3. FIG. 3 shows optical film 300, including alternating optical packet 310 and protective boundary layers 320. After processing, the delamination value measured for this film was approximately 370 g/in (3.6N/25.4 mm).

In-Display Luminance and Contrast Ratio

The in-display luminance and contrast ratio for an LCD display containing the films of Examples 1-3 and Comparative Examples C1-C3 were measured as follows. A commercially available tablet computer having an LCD panel was obtained. The film behind the LCD panel in the tablet contained an absorbing polarizer with a reflective polarizer attached with an adhesive. The reflective polarizer attached to the absorbing polarizer was removed and the various Comparative Example films and Example films were attached with an optically clear adhesive. The display was then re-assembled with the same back-light assembly that was received with the device. The luminance of the display and the contrast ratio was measured as a function of polar angle using an EZContrast XL88W conoscope (Model XL88W-R-111124, available from Eldim Optics, Herouville, Saint-Clair France). The results showed that the luminance and contrast ratio was very similar for all Example and Comparative Example films.

TABLE 1

| Sample | Optical Layer Count | Total Thick. (μm) | PBL Thick. + Skin (μm) | Draw Ratio | Tenter Temp (° C.) | Min Avg Delam (g/in) | Gain |
|---|---|---|---|---|---|---|---|
| Comp. Ex. C1 | 275 | 26.6 | 6 | 6 | 151 | 80 | 1.71 |
| Comp. Ex. C2 | 275 | 26.6 | 2 | 6 | 151 | 120 | 1.71 |
| Comp. Ex. C3a | 220 | 20 | 2 | 6 | 149 | 88 | 1.7 |
| Comp. Ex. C3b | 220 | 20 | 2 | 6.3 | 149 | 68 | 1.71 |
| Comp. Ex. C3c | 220 | 20 | 2 | 6.7 | 149 | 58 | 1.71 |
| Ex. 1a | 183 | 16.5 | 0.7 | 6.3 | 149 | 1,400 | 1.7 |
| Ex. 1b | 183 | 16.5 | 0.7 | 6.3 | 147 | 280 | 1.7 |
| Ex. 1c | 183 | 16.5 | 0.7 | 6.5 | 152 | 1,200 | 1.71 |
| Ex. 1d | 183 | 16.6 | 0.7 | 6.5 | 149 | 620 | 1.71 |
| Ex. 1e | 183 | 16.4 | 0.7 | 6.5 | 152 | 1,200 | 1.71 |
| Ex. 1f | 183 | 16.3 | 0.7 | 6.5 | 151 | 800 | 1.71 |
| Ex. 2a | 173 | 15.5 | 0.5 | 6.3 | 151 | 10,000+ | 1.67 |
| Ex. 2b | 173 | 15.5 | 0.5 | 6.3 | 147 | 10,000+ | 1.68 |
| Ex. 2c | 173 | 15.5 | 0.5 | 6.3 | 143 | 10,000+ | 1.69 |
| Ex. 2d | 173 | 15.5 | 0.5 | 6.7 | 147 | 250 | 1.7 |
| Ex. 3 | 187 | 16.3 | 0.25 | 6.5 | 147 | 370 | 1.71 |

The following are exemplary embodiments according to the present disclosure:

Item 1. A thermoplastic birefringent multilayer optical film comprising:
  alternating first and second layers having a linear layer profile;
  wherein both outer layers of the thermoplastic birefringent multilayer optical film are thinner than 350 nm but thicker than 150 nm;
  wherein no intermediate layer is thicker than 350 nm;
  wherein both outer layers of the thermoplastic birefringent multilayer optical film include the same material as either the first or second layer; and
  wherein a minimum average delamination of the thermoplastic birefringent multilayer optical film is greater than 100 g/in.

Item 2. The thermoplastic birefringent multilayer optical film of item 1, wherein no intermediate layer is thicker than 150 nm.

Item 3. The thermoplastic birefringent multilayer optical film of item 1, wherein at least one of the alternating first and second layers are oriented birefringent polymer layers.

Item 4. The thermoplastic birefringent multilayer optical film of item 1, wherein the thermoplastic multilayer optical film is thinner than 50 microns.

Item 5. The thermoplastic birefringent multilayer optical film of item 1, wherein the thermoplastic multilayer optical film is thinner than 20 microns.

Item 6. The thermoplastic birefringent multilayer optical film of item 1, wherein the thermoplastic multilayer optical film has fewer than 200 layers.

Item 7. The thermoplastic birefringent multilayer optical film of item 1, wherein the thermoplastic multilayer optical film is a reflective polarizer.

Item 8. The thermoplastic birefringent multilayer optical film of item 1, wherein the thermoplastic multilayer optical film is a mirror.

Item 9. A roll of film comprising the thermoplastic birefringent multilayer optical film of item 1.

Item 10. A backlight comprising the thermoplastic birefringent multilayer optical film of item 1.

All U.S. patents and patent applications cited in the present application are incorporated herein by reference as if fully set forth. The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. A multilayer optical film comprising a plurality of alternating first and second layers disposed between opposing outer layers, each of the first, second and outer layers thinner than 350 nm, the multilayer optical film thinner than 30 microns and having fewer than 200 layers, at least one of the first and second layers having birefringence, wherein a minimum average delamination of the multilayer optical film is greater than 100 g/in.

2. The multilayer optical film of claim 1, wherein each of the outer layers is thinner than 200 nm.

3. The multilayer optical film of claim 1 being thinner than 20 microns.

4. The multilayer optical film of claim 1 being thinner than 17 microns.

5. The multilayer optical film of claim 1, wherein each of the outer layers includes a same material as either the first or the second layer.

6. The multilayer optical film of claim 1 comprising no intermediate layer thicker than 350 nm.

7. The multilayer optical film of claim 1, wherein each of the outer layers is thicker than 150 nm.

8. A roll of film comprising the multilayer optical film of claim 1.

9. A backlight comprising the multilayer optical film of claim 1.

* * * * *